US010191967B2

United States Patent
Belghiti

(10) Patent No.: US 10,191,967 B2
(45) Date of Patent: Jan. 29, 2019

(54) CLUSTERING DATABASE QUERIES FOR RUNTIME PREDICTION

(71) Applicant: DASSAULT SYSTEMES, Velizy Villacoublay (FR)

(72) Inventor: Ismael Belghiti, Paris (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 430 days.

(21) Appl. No.: 14/979,077

(22) Filed: Dec. 22, 2015

(65) Prior Publication Data
US 2016/0188696 A1    Jun. 30, 2016

(30) Foreign Application Priority Data
Dec. 27, 2014    (EP) .................................... 14307192

(51) Int. Cl.
*G06F 17/30* (2006.01)
*G06K 9/62* (2006.01)

(52) U.S. Cl.
CPC .. *G06F 17/30598* (2013.01); *G06F 17/30336* (2013.01); *G06F 17/30463* (2013.01); *G06F 17/30469* (2013.01); *G06K 9/6223* (2013.01)

(58) Field of Classification Search
None
See application file for complete search history.

(56) References Cited

U.S. PATENT DOCUMENTS

2015/0234831 A1*  8/2015  Prasanna Kumar ........................ G06F 17/3053
                                                                                        707/718

FOREIGN PATENT DOCUMENTS

WO    WO 2014/060050 A1    4/2014

OTHER PUBLICATIONS

Extended European Search Report dated Jul. 9, 2015 in European Patent Application No. 14307191.8.
Extended European Search Report dated Jul. 9, 2015 in European Patent Application No. 14307192.6.
Extended European Search Report dated Jul. 9, 2015 in European Patent Application No. 14307193.4.
(Continued)

*Primary Examiner* — Jau Shya Meng
(74) *Attorney, Agent, or Firm* — Oblon, McClelland, Maier & Neustadt, L.L.P.

(57) ABSTRACT

The invention notably relates to a computer-implemented method of clustering reference queries in a database for prediction of the runtime of a target query in the database based on similarity of the target query with the reference queries. The method comprises providing a number of numerical values that represent the runtimes of the reference queries; computing the optimal K-means clustering of the numerical values for a predetermined number of clusters, wherein the computing includes iterating, a number of times corresponding to the predetermined number of clusters, a linear-time Row Minima Searching algorithm applied to a square matrix of order equal to the number of numerical values; and clustering the reference queries according to the computed clustering of the numerical values.
Such a method improves the field of database query runtime prediction.

8 Claims, 2 Drawing Sheets providing a number of numerical values that represent the runtimes of the reference queries — S10 computing the optimal K-means clustering of the numerical values for a predetermined number of clusters, including iterating, a number of times corresponding to the predetermined number of clusters, a linear-time Row Minima Searching algorithm applied to a square matrix of order equal to the number of numerical values — S20 clustering the reference queries according to the computed clustering of the numerical values — S30

(56) References Cited

OTHER PUBLICATIONS

Cromley R G.: "A comparison of optimal classification strategies for choroplethic displays of spatially aggregated data", International Journal of Geographical Information Systems; vol. 10, No. 4, Jun. 1996, pp. 405-424, XP009117383.
Wu X: "Optimal quantization by matrix searching", Journal of Algorithms, vol. 12, 1991, pp. 663-673; XP055199532.
Wu X, et al: "Quantizer monotonicities and globally optimal scalar quantizer design", IEEE Transactions on Information Theory, vol. 39, No. 3, May 1993, pp. 1049-1053, XP002233309.
Xu M: "K-means based clustering and context quantization", Dissertation, Computer Science, University of Joensuu, 2005, XP055199559, Retrieved from the Internet: URL:ftp.cs.joensuu.fi/pub/franti/papers/Xu/Xu_thesis.pdf.
Chen D Z., et al.: "Geometric algorithms for the constrained 1-D K-means clustering problems and IMRT applications", Lecture Notes in Computer Science, vol. 4613, Aug. 2007, pp. 1-13, XP019065991.
Brun L, et al: "Color quantization (Chapter 9)", Digital Color Imaging Handbook, 2003, CRC Press, XP055199557.
Aggarwal A, et al.: "Geometric applications of a matrix-searching algorithm", Algorithmica, vol. 2, Nov. 1987, pp. 195-208, XP055199088.
Murray A T., et al.: "Integrating attribute and space characteristics in choropleth display and spatial data mining", International Journal of Geographical Information Science, vol. 14, No. 7, Oct. 2000, pp. 649-667, XP055199771.
Nielsen F, et al.: "Optimal interval clustering: Application to Bregman clustering and statistical mixture learning", IEEE Signal Processing Letters, vol. 21, No. 10, Oct. 2014, pp. 1289-1292, XP011552926.
Wang H, et al.: "Ckmeans.1d.dp: Optimal k-means clustering in one dimension by dynamic programming", The R Journal, vol. 3, No. 2, Dec. 2011, pp. 29-33, XP055199020.
Hilferink M: "Fisher's natural breaks classification", ObjectVision wiki page, version 01.02.2014 at 14:49, Feb. 1, 2014, XP055199025, Retrieved from the Internet: URL:http://wiki.objectvision.nl.index.php?title=Fisher%27s_Natural_Breaks_Classication&oldid=1388.
Soong F K., et al.: "Optimal quantization of LSP parameters", IEEE Transactions on Speech and Audio Processing, vol. 1, No. 1, 1993, pp. 15-24, XP000358436.

* cited by examiner

CLUSTERING DATABASE QUERIES FOR RUNTIME PREDICTION

CROSS-REFERENCE TO RELATED APPLICATIONS

This application claims priority under 35 U.S.C. § 119 or 365 to European Application No. 14307192.6, filed Dec. 27, 2014. The entire teachings of the above application(s) are incorporated herein by reference.

FIELD OF THE INVENTION

The invention notably relates to the field of database engineering, and notably to a computer-implemented method, a computer program, and a system for clustering reference queries in a database.

BACKGROUND

Database engineering often involves different kinds of optimizations relative to queries on the database, and notably aims at performing workload prediction. The time taken to perform a query is called Workload, or simply Execution time, or Query runtime. This is in general the quantity that the optimizer will minimize even if it also often has to take into account other costs as the memory space and resource used. It is important to notice that the time needed to answer a query is the sum of the time to compute the query plan, and the time to execute the query plan. Some technologies tends to find a trade-off between these two quantities (such as in document US20050071331A1).

The most important application of Query Runtime Prediction is query optimization, which relies on these predictions to select a particular execution plan from an often very large number of candidates. In real-world applications, a database system has to answer numerous queries in a few time, that is why it operates a Query Scheduling (as detailed in the article "*Distribution-Based Query Scheduling*", by Chi, Hacigum, Hsiung, Naughton, 2013), this scheduling being based on different criteria as the expected query runtime, the priority of the user from which the query was sent, the priority of the concerned task.

Query runtime is thus a central information that one needs to estimate in order to schedule the queries. In particular, one wants to avoid bottleneck queries that could delay other important queries. Moreover, it could also be interesting to evaluate the runtime of a query in order to quantify how much resource to put on its computation such that the query will be performed before a given time limit. This is explained in document US20050192937. As mentioned, predicting the runtime of a query is at the core of query scheduling and therefore this problem has been intensively studied.

One natural way to predict the runtime of a query is to look for the runtime of "similar" queries that have already been performed (and for which one has stored the time used). In order to implement this kind of methods, one has to find good representations in order to compare the queries between them and to learn how to model their runtimes, using for example metrics as in the article "*Predicting Multiple Metrics for Queries: Better Decisions Enabled by Machine Learning*", by Ganapathi, Kuno, Dayal, Wiener, Fox, Jordan, and Patterson (2009), or model selection as in the article "*Learning to Predict Response Times for Online Query Scheduling*", by Macdonald, Tonellotto, and Ounis (2011). The choice of the representation of the queries and the way to model the runtime according to this representation depends on the language on which the queries are built. For example, the research report "*Predicting SPARQL Query Execution Time and Suggesting SPARQL Queries Based on Query History*", by Hasan and Gandon deals with the case of the SPARQL language.

The prediction of the runtime of a query can then be evaluated after a Machine Learning algorithm has been applied to a training set. In particular, the thesis "*Dynamic Cost Models for Query Runtime Prediction*" by Lima analyses the case of relational databases as PostgreSQL and tests different classical Machine Learning algorithms using a particular representation of the query. Undersupervised averaging, Undersupervised Linear Regression, Undersupervised K-Nearest-Neighbor Regression, Undersupervised Nadaraya-Watson Regression are all concepts at use.

Several articles have demonstrated that a powerful meta-method consists in dividing the queries of the training set in ranges of execution runtime and then apply the Machine Learning algorithm on each of the range. In particular, the article "*PQR: Predicting Query Execution Times for Autonomous Workload Management*", by Gupta, Mehta, Dayal (2008) uses this separation in time. Some methods also apply this paradigm recursively and obtain a PQR tree (as in documents U.S. Pat. No. 7,895,192B2 and US20080270346), where each node of the tree uses a predictor learned on the training data (recall that the training data is a set of queries whose execution time is known). One of the most robust general method consists in clustering the query times of the training set queries and then predicting the execution time of a given (new) query finding the cluster from which it is the closest (using a particular notion of similarity, often based on the similarity between the query and the centroids of the clusters) and then compute the query time according to the query times of the cluster. The above-mentioned research report "*Predicting SPARQL Query Execution Time and Suggesting SPARQL Queries Based on Query History*" by Hasan and Gandon and the article by Wang and Wong, "*Optimal k-means Clustering in One Dimension by Dynamic Programming*" show for example that this last computation can be performed by evaluating a predicted model learned on the cluster (that can be a simple average—in which case this last computation amounts in a way to a quantization (i.e. replacement of an input value by a closest one in a predetermined set of values, according to a predetermined distance)—or a more complex Machine Learning method as SVM). This framework relates to the more general field of cluster analysis.

Cluster Analysis concerns the task of partitioning a set of objects in groups (called clusters), so that in each group the data are similar (see the article of Jain et al., "*Data Clustering: A Review*"). It appears as a central problem in Data Mining (see the article of Chen et al., "*Data mining: an overview from a database perspective*"), Machine Learning (see the book of Murphy, "*Machine Learning, A Probabilistic Perspective*"), and Large Scale Search (see the article of Goodrum, "*Image Information Retrieval: An Overview of Current Research*"). Cluster Analysis is an important tool for Quantization: assigning a center to each cluster, one has a simple quantization that consists in quantizing each point to the center of its cluster.

The K-means clustering problem is the most famous problem of Cluster Analysis and was introduced by Stuart Lloyd in 1957 at Bell Laboratories, as a technique for Pulse-Code Modulation. The Lloyd algorithm takes as input a collection of p-dimensional points and outputs a partition of these points that aims to minimize the "total distortion".

This algorithm is only a heuristic (it does not provide the optimal clustering). But in fact we cannot hope for an exact algorithm since the K-means clustering problem is NP-hard in the non-one-dimensional case. The Lloyd algorithm is nowadays still widely used. Several variants have also been proposed (see J. A. Hartigan (1975), "*Clustering algorithms*", John Wiley & Sons, Inc.").

The one-dimension application is particularly important. One of the most famous algorithms for this problem is called Jenks natural breaks optimization developed in 1967 (see the book of Jenks, "*The Data Model Concept in Statistical Mapping*", in International Yearbook of Cartography) and was introduced for cartographic purpose. As Lloyd algorithm, it is only a heuristic. In 2011 an exact algorithm, called CKmeans, was developed by Wang and Song (see the article of Wang and Wong, "*Optimal k-means Clustering in One Dimension by Dynamic Programming*"). This algorithm is the corner stone of document U.S. Pat. No. 1,543,036A. It runs in time $O(K*n^2)$ where K is the requested number of clusters and n is the number of real numbers. Even more recently (in 2013), Maarten Hilferink has developed a more efficient algorithm and provides an implementation of it. This implementation was dedicated to cartography, more precisely for choropleth maps.

All these existing methods are however limited because either they do not produce the optimal K-means clustering, or they are too slow. Within this context, there is still a need for an improved solution to cluster queries for runtime prediction.

SUMMARY OF THE INVENTION

It is therefore provided a computer-implemented method of clustering reference queries in a database for prediction of the runtime of a target query in the database based on similarity of the target query with the reference queries. The method comprises the step of providing a number of numerical values that represent the runtimes of the reference queries. The method also comprises the step of computing the optimal K-means clustering of the numerical values for a predetermined number of clusters. The computing step includes iterating, a number of times corresponding to the predetermined number of clusters, a linear-time Row Minima Searching algorithm applied to a square matrix of order equal to the number of numerical values. And the method also comprises clustering the reference queries according to the computed clustering of the numerical values.

The method may comprise one or more of the following:
    the numerical values are sorted and indexed accordingly, and the iterating within the computing step includes, at each respective iteration rank, and for each respective index inferior to the number of numerical values, the computation of the minimal total distortion achievable for the subset of numerical values indexed lower than the respective index, with a number of clusters corresponding to the respective iteration rank, according to the linear-time Row Minima Searching algorithm applied to the square matrix;
    at each respective iteration rank, and for each respective index inferior to the number of numerical values, for each row index and each column index, the matrix entry corresponds to a sum of the minimal total distortion computed at the previous iteration for the index preceding the row index, and the distortion of the contiguous subset of the numerical values between the row index and the column index;
    the method further comprises, at each respective iteration rank, storing indices returned by the Row Minima Searching algorithm;
    the method further includes, at the computing step, determining the optimal clustering from the stored indices; and/or
    determining the optimal clustering from the stored indices comprises iteratively partitioning the numerical values, starting from the last indexed numerical value in the stored indices, wherein at each respective iteration rank, the index of the starting numerical value of the currently formed cluster is equal to the index stored, during the iterating within the computing step, at the iteration of rank equal the predetermined number of clusters minus the respective iteration rank for the row index equal to the index of the last indexed numerical value of the currently formed cluster.

It is further provided a method for predicting the runtime of a target query in a database. The prediction method comprises providing a clustering of reference queries in the database obtainable by the above clustering method and the runtimes of the reference queries. The prediction method also comprises associating the target query to a cluster of the clustering based on similarity of the target query with the reference queries. And the prediction method then comprises predicting the runtime of the target query according to the runtimes of the reference queries of the cluster associated to the target query.

It is further provided a computer program comprising instructions for performing the clustering and/or prediction method.

It is further provided a computer readable storage medium having recorded thereon the computer program.

It is further provided a system comprising a processor coupled to a memory, the memory having recorded thereon the computer program.

In an example, the memory further stores a database, the system being configured for execution of the program on reference queries in the database and/or on a target query in the database.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
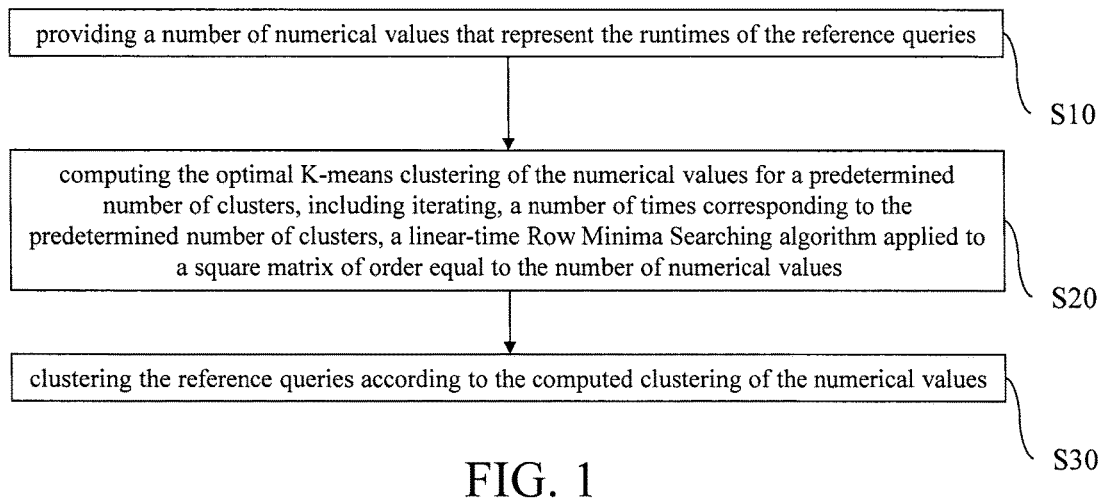
FIG. 1 shows a flowchart of an example of the method.

With reference to the flowchart of FIG. 1, it is proposed a computer-implemented method of clustering reference queries in a database (i.e. queries relative to a database), for prediction (i.e. the reference queries and their clustering being relevant/adapted to such later prediction, as known per se) of the runtime of a target query in the database (i.e. another query relative to—e.g. substantially—the same database) based on similarity (e.g. according to any predetermined query similarity criterion) of the target query with the reference queries. The method comprises the step of providing S10 a number (e.g. any number) of numerical values that represent the runtimes of the reference queries (i.e. each number corresponds/represents/equals—e.g. substantially—the runtime of a respective reference query, whose runtimes are indeed all known). The method also comprises the step of computing S20 the optimal K-means clustering of the numerical values for a predetermined number of clusters. The computing step S20 includes iterating, a number of times corresponding to the predetermined number of clusters, a linear-time Row Minima Searching algorithm applied to a square matrix of order equal to the number of numerical values. And the method comprises the step of clustering S30 the reference queries according to the computed clustering of the numerical values (i.e. each reference queries is assigned to the cluster of its respective runtime). Such a method improves the clustering of reference queries for future prediction of the runtime of a target query.

Notably, the method allows the clustering S30 of reference (whose runtimes are known) based on their runtimes, as also known from the art. Because the method performs such clustering S30 by computing S20 the optimal K-means clustering, the method performs a relatively good clustering from the point of view of a future runtime prediction, as widely known from the art of database engineering. But most importantly, the method performs such computation S20 by iterating, a number of times corresponding to the predetermined number of clusters, a linear-time Row Minima Searching algorithm applied to a square matrix of order equal to the number of numerical values. Thanks to this specific algorithmic framework implemented by the method, the computation of the optimal K-means clustering is performed fast, as detailed later.

The method is computer-implemented. This means that the steps (or substantially all the steps) of the method are executed by at least one computer, or any system alike. Thus, steps of the method are performed by the computer, possibly fully automatically (e.g. all steps but the providing S10, or, semi-automatically. In examples, the triggering of at least some of the steps of the method may be performed through user-computer interaction (e.g. the providing S10). The level of user-computer interaction required may depend on the level of automatism foreseen and put in balance with the need to implement the user's wishes. In examples, this level may be user-defined and/or pre-defined.

A typical example of computer-implementation of the method is to perform the method with a system adapted for this purpose. The system may comprise a processor coupled to a memory, the memory having recorded thereon a computer program comprising instructions for performing the method. The memory may also store a database, adapted to maintain the data processed by the method. The memory is any hardware adapted for such storage, possibly comprising several physical distinct parts (e.g. one for the program, and possibly one for the database).

Figure 2:
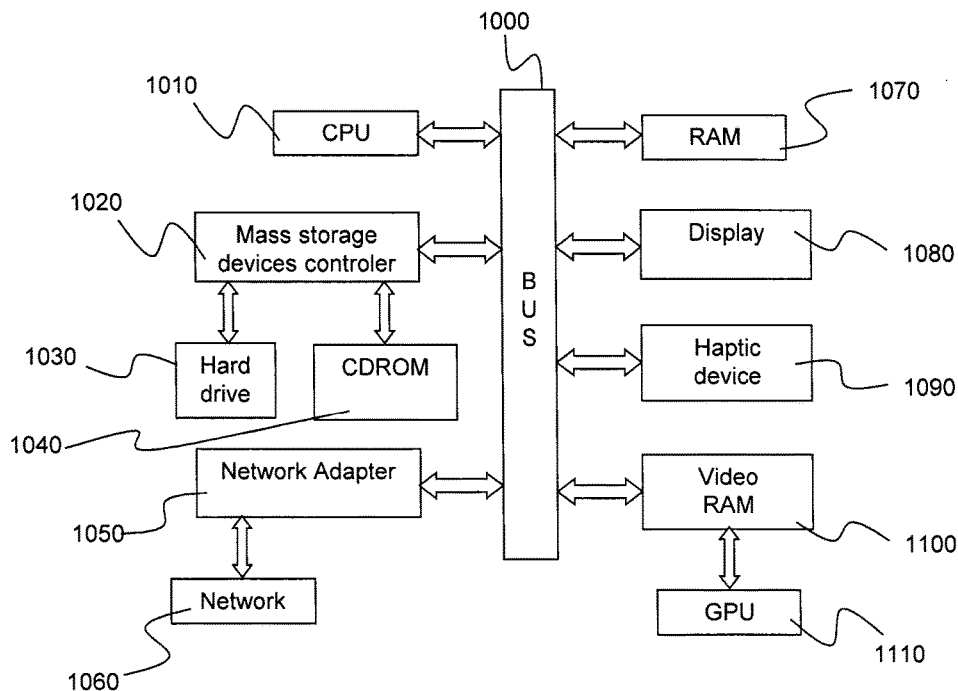
FIG. 2 shows an example of the system.

FIG. 2 shows an example of the system, wherein the system is a client computer system, e.g. a workstation of a user. The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method proposes an improved data clustering algorithm, applied to query runtime prediction in specific. But before detailing the algorithmic solution of the method, its context (i.e. the application) is now detailed).

The method is for clustering reference queries in a database. The clustering is performed for (later) prediction of the runtime of a target query (i.e. time to compute the query plan plus/or time to execute the query plan, or even time to execute a sub-query in case the target query inputted to the method is a sub-query, e.g. outputted from computing the query plan of a regular query) in the database (i.e. the time taken relative to the run on the specific database under consideration) based on similarity (e.g. any similarity criterion, such as those of the prior art) of the target query with the reference queries. In other words, the method allows prediction of the runtime of a (possibly future) given query (i.e. the target query) based on a prior clustering of (possibly former) reference queries, the clustering being performed based on the runtimes of the reference queries. The reference queries thus form a training set as known in the art and as discussed earlier. For example, the reference queries may simply be any set of queries whose runtimes are known (for example, prior to the method, a database is provided, a set of queries is provided, and the queries of the set are executed on the database, and keeping track of the runtimes allows the determining of the data to be provided at S10). The target query inputted later may even be added to the reference queries once it has been performed and its real runtime is known, in a case the method is continuously iterated and the clustering updated.

The reference queries are clustered, and they are associated to their (known and real) runtimes (i.e. which are thus provided at S10 in the form of numerical values representative of durations). In an example, only one representative runtime is kept for each cluster at the end of the method, e.g. the center of the cluster, that is, the mean of the cluster. Then, when a (new) target query is provided, the prediction algorithm may associate this target query to one of the clusters based on similarity of the target query with the reference queries. Any association scheme based on similarity may here be implemented, such as those discussed earlier in connection with the discussion on the prior art. This is known per se. For example, once a clustering S30 is available, a target query may be associated to one of the clusters according to a predetermined query distance criterion evaluated between the target query and all queries, or one or more representative queries (e.g. reference query(ies) whose runtime(s) is(are) closest to the center of the cluster) of each cluster. This evaluation leads to the determination of a "closest" cluster (based on the query distance criterion). The runtime of the target query may then be predicted based on such information.

The prediction algorithm may indeed then predict the runtime of the target query according to the runtimes of the reference queries of the cluster associated to the target query. Again, this may be performed as known per se, for example according to any existing prior art. For example, an efficient and direct implementation of this step is to take the center of the associated cluster (i.e. the runtime predicted for the target query is the average runtime of the reference queries of the associated cluster). In a more complex implementation, Support Vector Machine may be used. The method is thus particularly useful to avoid bottleneck in query time scheduling (e.g. a target query with a predicted runtime higher than a predetermined threshold may be postponed to be executed once a total number of concurrent queries is inferior to a predetermined threshold, and/or at a time where it is known that the database is less queried, for example at night), execution plan optimization, and is particularly adapted for Federated Database Systems.

The numerical values (x1, . . . , xn) provided at S10 are now further discussed.

These numerical relate to a database by representing runtimes of queries (the reference queries) on/in this database. Thus, the numerical values are associated to a predetermined database. Of course, the database may evolve slightly over time, but then the method may be iterated regularly, so as to obtain an update of the prediction scheme, as known from the art. At transitions, the runtimes provided at S10 may not be exact (because the database has evolved), but they still form good approximations. In any case, such updating matters are obvious to the skilled person and outside the scope of the present discussion. It is noted that the present discussion refers to a query "in" a database, meaning that the query and its runtime are considered relative to a predetermined database (the runtime of a query is the time taken for execution of the query on said database).

Examples of databases and of queries therein contemplated by the method are now discussed.

A Database (DB) is an organized collection of data that is stored in such a way that a user can retrieve specific pieces of information using queries that are expressed in a well-defined language. The interface between the user and the database is called the Database Management System (DBMS). The most famous DBMS are MySQL, PostgreSQL, Microsoft SQL Server, Oracle, SAP and DB2.

The notion of Database is very generic and encompasses many kinds of functionally different systems. The database of the method may be of any of the following kinds:

Deductive Database (such as described in "*Logic Programming and Databases*", Tanca, 1990)

Distributed Database (such as described in "*Principles of Distributed Databases*", Özsu, Valduriez, 2011)

Federated Database Systems (such as described in "*A Federated Architecture for information management*", McLeod, Heimbigner, 1985)

Graph Database (such as described in "*Survey of graph database models*", Angles, Gutierrez, 2008), Knowledge Base (such as described in "*Report on a knowledge-based software assistant*", Green, Cordell, Luckham, Balzer, Cheatham, Rich, 1986)

Operational Database (such as described in "*Management Information Technology Systems*", O'Brien, Marakas, 2008.)

Probabilistic Database (such as described in "Efficient query evaluation on probabilistic databases", Dalvi, Suciu, 2007)

Temporal Database (such as described in "*TSQL2 Temporal Query Language*", Snodgrass, 2009)

All these kinds of databases use different algorithmic data structures to store their information, however they are all related by the notion of query. Even if the languages used to express the queries depend on the nature of the database, their structures often share a common shape. In particular, Federated Database Systems are designed such that a user can interact, under a unified framework, with cooperating databases of different natures. Since the core of the method deals with queries and their runtimes, it is generic in the sense that it can be used for any kind of database.

Queries contemplated by the method may be written by a user, and are thus often expressed in a declarative language (e.g. SQL) and may be transformed in order to be answered efficiently. This transformation is performed by a unit called Query Optimizer (and it may be performed such as in the article "*Query optimization*", by Ioannidis and Yannis, 1996), that aims to re-express the user query such that it can be decomposed in smaller sub-queries that will be processed according to a dependency scheme, called Query Plan, or Execution Plan. A query plan is often represented as a tree of "plain nodes", in which each node correspond to an atomic operation and where the calculation is done from the leaves to the root, the result of the root corresponding to the answer given to the user (such as in the above-cited article "*An Overview of Query Optimization in Relational Systems*", by Chaudhuri and Surajit, 1998, or in documents U.S. Pat. No. 5,694,591 or US20060031189).

The method belongs to the category of methods that use a clustering on the query times, the core of the method concerning Scalar Clustering. As mentioned above, these methods are highly related to Cluster Analysis. The method produces an optimal clustering (with respect to the "total distortion", which is the standard objective function), being faster than the nowadays other optimal clustering devices. In fact, as shown later, the computation time of the method is comparable (and often even faster) than the best heuristic methods (that produce non-optimal quantization).

The method may follow the below pipeline (also presented above):

Step 1: Clustering the query times
Step 2: Learning a model on each cluster
Step 3: Predicting the query runtime The core of the method is on Step 1 and proposes a fast method to compute an optimal clustering scheme. Since step 2 and 3 have already been mentioned in the background art section, and depend on the particular model one has on the query (that depends on the language in which it is expressed, the type of database it concerns, but also the concrete underlying application), the present discussion will mainly only focus on Step 1, and only do a brief recall of the ideas for steps 2 and 3.

The step of Learning a Model on each cluster, already discussed earlier, is now briefly further detailed. These details are all known from the prior art.

The simplest model that the method builds on a cluster consists in considering that any query lying in this cluster will have a predicted runtime that equals the average of the runtimes of the cluster (this is for example the choice taken in document WO2014060050-"A federated database system").

More complex techniques use Machine Learning algorithms based on the representation of the queries (that consists in a list of features that can be seen as internal statistics of the query, see the article "*Predicting Multiple Metrics for Queries: Better Decisions Enabled by Machine Learning*", by Ganapathi et al., 2009). For example, above-cited research report "*Predicting SPARQL Query Execution Time and Suggesting SPARQL Queries Based on Query History*", by Hasan and Gandon uses Support Vector Machine to learn a predictor in each cluster.

The step of Predicting the query runtime, already discussed earlier, is now briefly further detailed. These details are all known from the prior art.

When a new query is given, the classical strategy consists in finding the "most similar cluster" of the query and then simply apply the model learnt in step 2. Depending on the number of clusters and the number of the size of each cluster, the number of comparisons performed between the target query and the ones of a particular cluster may vary. One approach is to only compare the target query to the centroids of each cluster as proposed in document U.S. Pat. No. 1,543,036A, using a particular notion of similarity as discussed earlier.

At this point, the context of the method and many examples thereof have been provided, but details on the core of the method (i.e. the computing S20 step that defines the later clustering S30) have not been provided yet. This is done hereunder, being noted that all implementation examples provided below may be applied in any of the example applications provided above.

As indicated before, the method comprises a step of computing S20 the optimal K-means clustering of the numerical values for a predetermined number K of clusters. But this is not done brutally. Indeed, the computing step S20 includes iterating a linear-time Row Minima Searching algorithm a number of times corresponding to K (K−1 times in an example discussed later). Thanks to its use of any predetermined linear-time algorithm of the well-known category of Row Minima Searching algorithms, the computing step S20 has a low complexity. The method thus implements a new and algorithmically efficient solution of the K-means clustering problem.

Before providing more details on the computing step S20, scalar quantization is now discussed. Indeed, the clustering S20-S30 of the method may follow in an example the framework of a scalar quantization, as it may cluster the reference queries relative to the runtimes by virtually "quantizing" these runtimes, and defining clusters in association to the virtual quantized values. Indeed, reference queries of a cluster are associated to a virtual runtime equal to the center of the cluster (i.e. the average of the runtimes of the reference queries of said queries). The runtimes of the reference queries are thus quantized this way.

As known, scalar Quantization is a computational tool that approximates real values using a finite set $V=\{c_1, \ldots, c_K\} \subset \mathbb{R}$, where the elements of V, called digital steps, are the values that are used as approximations. A scalar quantizer is mathematically defined as a mapping:

$$q: \mathbb{R} \to V = \{c_1, \ldots, c_K\},$$

such that the distance between x and q(x) is small, the distance being any predetermined distance (where the notion of distance may depend on the context), such as the Euclidian distance.

In practice, scalar quantizers are always defined through a partition of $\mathbb{R}$ into intervals $I_1=]-\infty, \alpha_1[$, $I_2=[\alpha_1, \alpha_2[, \ldots, I_K=[\alpha_{K-1}, \infty[$ (with $\alpha_1 < \ldots < \alpha_{K-1}$) and then to each $x \in \mathbb{R}$, denoting $I_i$ the only interval such that $x \in I_i$, we associate the value $q(x)=c_i$. The real numbers $\alpha_1, \ldots, \alpha_{K-1}$ are called "decision bounds". The article of Gray and Neuhoff, "*Quantization*", provides a complete survey of quantization.

The method focuses on the K-means setting, as widely known and defined for example in the article of MacQueen, "*Some Methods for classification and Analysis of Multivariate Observations*", which is the most widely used. In this setting, the method finds at S20, for a given tuple $(x_1, \ldots, x_n) \in \mathbb{R}^n$ sorted in increasing order and for a given integer K (typically, $K=2^b$ where b is the number of bits available to encode each $x_i$), a quantizer q using K digital steps that achieves a minimal total distortion, the total distortion being defined as:

$$TD(q) = \sum_{1 \le i \le n} (x_i - q(x_i))^2$$

It is clear that to minimize this quantity the method may only deal with quantizers that map each real value x to its closest digital steps. Hence the problem is just equivalent to finding the K centers $c_1, \ldots, c_K$ that minimize:

$$TD(\{c_1, \ldots, c_K\}) = \sum_{1 \le i \le n} \min_{1 \le k \le K} (x_i - c_k)^2$$

Figure 3:
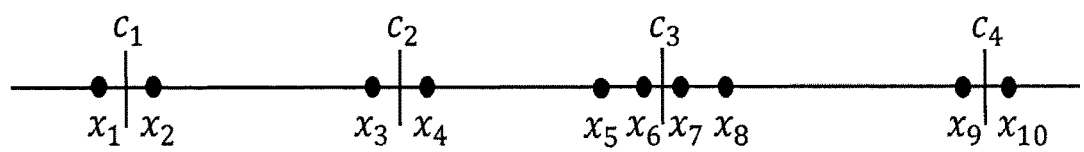
FIG. 3 illustrates the method.

FIG. 3 shows an example for ten values and 4 digital steps. An optimal quantization is given by a set $\{c_1, \ldots, c_K\}$ such that: $\forall c'_1, \ldots, c'_k, TD(\{c'_1, \ldots, c'_k\}) \ge TD(\{c_1, \ldots c_K\})$.

Minimizing this total distortion has to be understood as losing as few information as possible during the quantization step (for a given K). Note that, each point $x_i$ being implicitly assigned to its nearest center, the method may thus be constructing a partition into clusters where each cluster corresponds to the set of points assigned to a given center (finding the best quantizer is thus a clustering problem, as explained by Lloyd in "*Least square quantization in PCM*"). For each $k \in \{1, \ldots, K\}$, let us denote by $C_k$ the cluster that corresponds to the center $c_k$. It is easy to see that each center is in fact the mean of the points of its corresponding cluster. It is moreover noted that, since it is assumed that $x_1 < \ldots < x_n$, each cluster consists in a contiguous subset of points. For example, if we have 47 real numbers that we want to partition in K=4 clusters, a possible optimal clustering could be:

$$([\underbrace{x_1, \ldots, x_{17}}_{c_1}], [\underbrace{x_{18}, \ldots, x_{24}}_{c_2}], [\underbrace{x_{25}, \ldots, x_{42}}_{c_3}], [\underbrace{x_{43}, \ldots, x_{47}}_{c_4}])$$

For all $1 \le a \le b \le n$, we introduce the notation $$\text{mean}(a, b) = \frac{1}{b-a+1} \sum_{\{a \le i \le b\}} x_i$$

and we also denote $\text{disto}(a,b) = \Sigma_{\{a \le i \le b\}} (x_i - \text{mean}(a,b))^2$. The corresponding total distortion of the previous example can be written:

$$TD = \text{disto}(1,17) + \text{disto}(18,24) + \text{disto}(25,42) + \text{disto}(43, 47)$$

As mentioned earlier, solutions for this problem already exist, but they are slower than the method and for most of them are just heuristic (i.e. do not produce the optimal quantization).

In an example implementation of the method, the numerical values are sorted and indexed accordingly. The iterating within the computing step S20 includes, at each respective iteration rank k, and for each respective index j inferior to the number n of numerical values, the computation of the minimal total distortion, noted $TD_{min}(j,k)$, achievable for the subset of numerical values $x_i$ indexed lower than j (thus $i \le j$), with a number of clusters k corresponding to the respective iteration rank (thus, k), according to the linear-time Row Minima Searching algorithm applied to the square matrix H.

In this example, at each respective iteration rank k, and for each respective index j inferior to the number n of numerical values, for each row index i and each column index j, the matrix entry H(i,j)) may correspond to a sum of:

the minimal total distortion ($TD_{min}(i-1,k-1)$) computed at the previous iteration for the index (i-1) preceding the row index, and the distortion (disto(i,j)) of the contiguous subset ($x_i, \ldots, x_j$) of the numerical values between the row index and the column index.

Such implementation provides a system that outperforms existing clustering methods since it also produces the optimal K-means clustering but runs fasters, specifically in time O(K*n). It is noted that, for typical uses, the method of the example performs more than ten times faster than "good" heuristics.

A more complete Overview of the clustering algorithm of the example is now discussed.

In order to compute the optimal partition, the method uses the Dynamic Programming paradigm (as described in the article of Bellman, "*The theory of dynamic programming*"). In particular, the method of the example computes for each $j \in \{1, \ldots, n\}$ and each $k \in \{1, \ldots, K\}$, the value $TD_{min}(j, k)$ defined as the minimal total distortion that we can achieve with at most k clusters if we only consider the j first points ($x_1, \ldots, x_j$).

By definition, we have for all $j \in (1, \ldots, K)$: $TD_{min}(j, 1) = \text{disto}(1,j)$, since the only way to partition a set of points in one cluster is to take them all. Moreover we have the following formula, for all $k \in \{2, \ldots, k\}$ and for all $j \in \{1, \ldots, n\}$:

$$TD_{min}(j, k) = \min_{1 \le i \le j} \{TD_{min}(i-1, k-1) + \text{disto}(i, j)\}$$

This formula expresses the fact that the minimal total distortion that we can achieve for ($x_1, \ldots, x_j$) with at most k clusters consists, for a certain i, in an optimal clustering of the i-1 first points with at most k-1 clusters and [$x_i, \ldots, x_j$] as final cluster. The previous formula is at the core of the method. Remark that if one has, for a given $k \in \{2, \ldots, K\}$, computed the values $TD_{min}(j,k-1)$ for all j, then the method one could compute for all j the value $TD_{min}(j,k)$ by testing all possible $i \in \{1, \ldots, j\}$ in the previous formula. However this hypothetical technique would lead to a very slow algorithm.

In order to overcome this, the method uses a particular category of algorithms for Row Minima Searching in particular matrices.

The concepts of Row Minima Searching and Total monotonicity on which the method of the example relies are now discussed.

A Row Minima Searching algorithm is (as detailed in the article of Bradford and Reinert, "*Lower Bounds for Row Minima Searching*", 1996) an algorithm that takes as input a function $f: [[1,R]] \times [[1,C]] \to \mathbb{R}$ such that for all $1 \le i \le R$, $1 \le j \le C$, the value $f(i,j)$ can be computed in constant time, and outputs a vector of integers $p = (p_1, \ldots, p_R)$ such that:

$$\forall 1 \le i \le R, p_i = \text{argmin}_{1 \le j \le C} f(i,j)$$

In the following we denote by F the matrix $F = (f(i,j))_{i,j}$. It is noted for the sake of completeness that if the matrix F has no particular property, then one may ask for all its entries in order to compute the vector p. However, under certain conditions on F, one can implement algorithms that are drastically faster.

The matrix F is called totally monotone if it satisfies the following condition: "For i,j,k with i<j, if we have F(k,i)<F(k,j) then for all k'≤k we also have F(k',i)<F(k',j)."

There exist linear-time algorithms for Row Minima Searching in Totally Monotone Matrices (as explained in the article by Alon and Azar, "*Comparison-Sorting and Selecting in Totally Monotone Matrices*"). Any of such predetermined algorithms (i.e. linear-time Row Minima Searching algorithm) may be implemented by the method at S20 on matrix H. In particular, the Inventor has tested the method using the widely known SMAWK algorithm, presented in the paper of Alon and Azar, with dramatically fast convergence (relative to the prior art).

The fundamental property that allows the method to perform dramatically fast will now be discussed. Before that, it is noted that the identification of this property leads to the creation of a bridge between the K-means clustering problem and the widely known and powerful algorithms provided for Row Minima Searching, and that the long history of research on K-means clustering has never identified such a bridge.

Theorem:

For all $1 \le i < j < n$, we have: disto(i,j)+disto(i+1,j+1)≤disto(i,j+1)+disto(i+1,j).

Demonstration:

First of all, remark that for $1 \le a \le b \le n$, disto(a, b) is by definition equal to the variance of ($x_a, \ldots, x_b$) multiplied by (b-a+1).

Therefore, we have from the Konig-Huygens formula that:

$$disto(a, b) = \sum_{a \leq i \leq b} x_i^2 - \frac{1}{b-a+1}$$

Let us consider i and j such that $1 \leq i < j < n$.

Denoting $p=(b-a+1)$, $S=\Sigma_{i \leq l \leq j} x_l$, $\alpha=x_{j+1}$ and $\beta=x_i$, we have from the previous identity:

$$disto(i, j) = \sum_{i \leq l \leq j} x_l^2 - \frac{S^2}{p} \quad (1)$$

$$disto(i, j+1) = \sum_{i \leq l \leq j+1} x_l^2 - \frac{(S+\alpha)^2}{p+1}$$

And therefore: $disto(i, j+1) - disto(i, j) = \alpha^2 + \frac{S^2}{p} - \frac{(S+\alpha)^2}{p+1}$.

We have moreover:

$$disto(i+1, j) = \sum_{i+1 \leq l \leq j} x_l^2 - \frac{(S-\beta)^2}{p-1} \quad (2)$$

$$disto(i+1, j+1) = \sum_{i+1 \leq l \leq j+1} x_l^2 - \frac{(S-\beta+\alpha)^2}{p}$$

And therefore: $disto(i+1, j) - disto(i+1, j+1) =$ $$-\alpha^2 + \frac{(S-\beta)^2}{p-1} - \frac{(S-\beta+\alpha)^2}{p}.$$

Let us denote $\Delta = disto(i,j+1) - disto(i,j) + disto(i+1,j) - disto(i+1,j+1)$ The theorem we want to prove is then simply equivalent to $\Delta \geq 0$.

Moreover, adding equation (1) and (2), we obtain that:

$$\Delta = \frac{S^2}{p} - \frac{(S+\alpha)^2}{p+1} - \frac{(S-\beta)^2}{p-1} + \frac{(S-\beta+\alpha)^2}{p}$$

Our goal is now to use this expression to show that $\Delta \geq 0$.

Without loss of generality, we can assume that $S=0$ since the problem is invariant by translation (it corresponds to translate all the points by $$-\frac{S}{p}$$

such that we have:

$$\Delta = -\frac{\beta^2}{p-1} - \frac{\alpha^2}{p} + \frac{(\alpha-\beta)^2}{p}$$

$$= \frac{1}{p(p-1)(p+1)} \Delta'$$

With $$\Delta' = -p(p+1)\beta^2 - p(p-1)\alpha^2 + (p-1)(p+1)(\alpha-\beta)^2$$

Grouping the terms, we can write:

$$\Delta' = -(p+1)\beta^2 + (p-1)\alpha^2 - 2(p+1)(p-1)\alpha\beta$$

Now remark that $S = x_i + \ldots + x_j = \beta + \ldots + \alpha \leq \beta + (p-1)\alpha$ since $\alpha \geq x_l$ for all $l \in \{i+1, \ldots, j\}$ (remember that $x_1 < \ldots < x_n$). Since we assumed that $S=0$, we get that:

$$(p-1)\alpha \geq -\beta$$

Moreover we clearly have $\beta \leq 0$ since it is the smaller term of the sum S that is null, so it follows that $$-(p-1)\alpha\beta \geq \beta^2$$

Reinjecting this inequality in the last expression of $\Delta$ we obtain that:

$$\Delta' \geq -(p+1)\beta^2 + (p-1)\alpha^2 + 2(p+1)\beta^2 \geq (p-1)\alpha^2 + (p+1)\beta^2$$

Hence we have $\Delta' \geq 0$ and consequently $\Delta \geq 0$, which concludes the proof. □

Now, for a fixed $k \in \{2, \ldots, K\}$, assume that the method has computed all the $TD_{min}(j,k-1)$ for all j. Let us recall that the $(TD_{min}(j,k))_j$ can be retrieved for all j through the relation:

$$TD_{min}(j, k) = \min_{1 \leq i \leq j} \{TD_{min}(i-1, k-1) + disto(i, j)\}$$

We will now see how the above-stated property will help the method compute all the $(TD_{min}(j,k))_j$ from the $(TD_{min}(j, k-1))_j$ in time $O(n)$.

First let us denote $H(i,j) = TD_{min}(i-1, k-1) + disto(i,j)$.

Since $disto(i,j) + disto(i+1,j+1) \leq disto(i,j+1) + disto(i+1,j)$, we obtain by adding on both sides $TD_{min}(i-1,k-1) + TD_{min}(i,k-1)$ that:

$$H(i,j) + H(i+1,j+1) \leq H(i,j+1) + H(i+1,j)$$

This property is called the Monge's property (see the article by Cechlárová and Szabó, "*On the Monge property of matrices*") of the matrix $H=(H(i,j))_{i,j}$ (in fact the method may discard the definition of H(i,j) when j<i but such a missing value is not really a problem in practice, and this is not further discussed). In some literature, it is also known as a Knuth-Yao quadrangle inequality (see for example the article of Bein, Golin, Larmore, and Zhang, "The *Knuth-Yao quadrangle-inequality speedup is a consequence of total-monotonicity*").

By Theorem, the matrix H is totally monotone, i.e: if for i,j,k with i<j we have H(k,i)<H(k,j) then for all k'≤k we also have H(k',i)<H(k',j). This is actually a well-known property of Monge's matrices and does not need to be proved.

Now, remark that computing the $(TD_{min}(j,k))_j$ is equivalent to computing the minimum of each of the rows of matrix H. Here the method of the example invokes any predetermined linear-time Row Minima searching algorithm (such as the SMAWK algorithm), which happens to be exactly designed for this sub-problem that it solves in time $O(n)$. Remark that the matrix H is of size n×n but the method does not need to construct it entirely. The method may just provide e.g. to the SMA WK subroutine a way to compute any H entry in constant time.

So in practice, the algorithm of the method may first compute the first layer $(TD_{min}(j,0))_j$, then it will compute the second layer $(TD_{min}(j,1))_j$ using the Row Minima Searching (RMS) subroutine, and then compute the third layer $(TD_{min}(j,2))_j$ using a second time the RMS algorithm and so on, until the method gets all the $(TD_{min}(j,k))_{j,k}$. Since each of the K layers costs a time $O(n)$ to be computed, the whole algorithm runs in time $O(Kn)$.

At this point, in an example, the method may further comprises, at each respective iteration rank k, storing the indices returned by the Row Minima Searching algorithm, for example in a dedicated matrix $Cut_{min}$. The method of this example may further include, at the computing step S20 determining the optimal clustering from the stored indices.

In a simple and direct implementation, determining the optimal clustering from the stored indices comprises working within matrix $Cut_{min}$. In specific, the method of the example iteratively partitions the numerical values, starting from the last indexed numerical value ($Cut_{min}(n,K)$). At each respective iteration rank q, the index of the starting numerical value of the currently formed cluster is equal to the index that was stored (during the iterating within the computing step S20), at the iteration of rank K-q.

In other words, if one remarks that each time the method computes a minimum, it is clear that the method may also get the index that reaches this minimum. More precisely, each value of $(TD_{min}(j,k))_{j,k}$ is computed as a minimum whose index can be stored in a matrix $(Cut_{min}(j,k))_{j,k}$. From that the method can easily get the optimal partition only looking at the table $Cut_{min}$.

The invention claimed is:

1. A computer-implemented method of clustering reference queries in a database for prediction of the runtime of a target query in the database based on similarity of the target query with the reference queries, the method comprising:
   providing a number (n) of numerical values ($x_1, \ldots, x_n$) that represent the runtimes of the reference queries;
   computing the optimal K-means clustering of the numerical values for a predetermined number (K) of clusters, wherein the computing includes iterating, a number of times corresponding to the predetermined number of clusters, a linear-time Row Minima Searching algorithm applied to a square matrix (H) of order equal to the number of numerical values; and
   clustering the reference queries according to the computed clustering of the numerical values,
   wherein the numerical values ($x_1, \ldots, x_n$) are sorted and indexed accordingly, and the iterating within the computing includes, at each respective iteration rank (k), and for each respective index (j) inferior to the number (n) of numerical values, the computation of a minimal total distortion ($TD_{min}(j,k)$) achievable for the subset of numerical values ($x_i$) indexed lower than the respective index (i<=j), with a number of clusters corresponding to the respective iteration rank (k), according to a linear-time Row Minima Searching algorithm applied to the square matrix (H), and
   wherein, at each respective iteration rank (k), and for each respective index (j) inferior to the number (n) of numerical values, for each row index (i) and each column index (j), the matrix entry (H(i,j)) corresponds to a sum of:
   the minimal total distortion ($TD_{min}(i-1,k-1)$) computed at the previous iteration for the index (i-1) preceding the row index, and
   a distortion (disto(i,j)) of the contiguous subset ($x_i, \ldots, x_n$) of the numerical values between the row index and the column index.

2. The method of claim 1, wherein the method further comprises, at each respective iteration rank (k), storing indices ($Cut_{min}(j,k)$) returned by the Row Minima Searching algorithm.

3. The method of claim 2, wherein the computing further includes, an optimal clustering from the stored indices.

4. The method of claim 3, wherein determining the optimal clustering from the stored indices comprises iteratively partitioning the numerical values, starting from the last indexed numerical value ($Cut_{min}(n,K)$) in the stored indices ($Cut_{min}$), wherein at each respective iteration rank (q), the index of the starting numerical value of the currently formed cluster is equal to the index stored, during the iterating within the computing, at an iteration of rank (K-q) equal the predetermined number of clusters minus the respective iteration rank (q) for the row index equal to the index of the last indexed numerical value of the currently formed cluster.

5. A method for predicting the runtime of a target query in a database, the method comprising:
   providing a clustering of reference queries in the database obtainable by a computer-implemented method of clustering reference queries in a database for prediction of the runtime of a target query in the database based on similarity of the target query with the reference queries, further comprising
   providing a number (n) of numerical values ($x_1, \ldots, x_n$) that represent the runtimes of the reference queries;
   computing the optimal K-means clustering of the numerical values for a predetermined number (K) of clusters, wherein the computing includes iterating, a number of times corresponding to the predetermined number of clusters, a linear-time Row Minima Searching algorithm applied to a square matrix (H) of order equal to the number of numerical values;
   clustering the reference queries according to the computed clustering of the numerical values;
   providing the runtimes of the reference queries;
   associating the target query to a cluster of the clustering based on similarity of the target query with the reference queries; and
   predicting the runtime of the target query according to the runtimes of the reference queries of the cluster associated to the target query,
   wherein the numerical values ($x_1, \ldots x_n$) are sorted and indexed accordingly, and the iterating within the computing includes, at each respective iteration rank (k), and for each respective index (j) inferior to the number (n) of numerical values, the computation of the minimal total distortion ($TD_{min}(j,k)$) achievable for the subset of numerical values ($x_i$) indexed lower than the respective index (i<=j), with a number of clusters corresponding to the respective iteration rank (k), according to the linear-time Row Minima Searching algorithm applied to the square matrix (H), and
   wherein, at each respective iteration rank (k), and for each respective index (j) inferior to the number (n) of numerical values, for each row index (i) and each column index (j), the matrix entry (H(i,j)) corresponds to a sum of:
   the minimal total distortion ($TD_{min}(i-1,k-1)$) computed at the previous iteration for the index (i-1) preceding the row index, and
   a distortion (disto(i,j)) of the contiguous subset ($x_i, \ldots, x_j$) of the numerical values between the row index and the column index.

6. A non-transitory computer readable medium having recorded thereon a computer program comprising instructions for performing a computer-implemented method of clustering reference queries in a database for prediction of the runtime of a target query in the database based on similarity of the target query with the reference queries, the method comprising:
   providing a number (n) of numerical values ($x_1, \ldots, x_n$) that represent the runtimes of the reference queries;

computing the optimal K-means clustering of the numerical values for a predetermined number (K) of clusters, wherein the computing includes iterating, a number of times corresponding to the predetermined number of clusters, a linear-time Row Minima Searching algorithm applied to a square matrix (H) of order equal to the number of numerical values; and clustering the reference queries according to the computed clustering of the numerical values, wherein the numerical values ($x_1, \ldots, x_n$) are sorted and indexed accordingly, and the iterating within the computing includes, at each respective iteration rank (k), and for each respective index (j) inferior to the number (n) of numerical values, the computation of the minimal total distortion ($TD_{min}(j,k)$) achievable for the subset of numerical values ($x_j$) indexed lower than the respective index (i<=j), with a number of clusters corresponding to the respective iteration rank (k), according to the linear-time Row Minima Searching algorithm applied to the square matrix (H), and wherein, at each respective iteration rank (k), and for each respective index (j) inferior to the number (n) of numerical values, for each row index (i) and each column index (j), the matrix entry (H(i,j)) corresponds to a sum of:

the minimal total distortion ($TD_{min}(i-1,k-1)$) computed at the previous iteration for the index (i−1) preceding the row index, and a distortion (disto(i,j)) of the contiguous subset ($x_i, \ldots, x_j$) of the numerical values between the row index and the column index.

7. A system comprising a processor coupled to a memory, the memory having recorded thereon a computer program comprising instructions for performing a computer-implemented method of clustering reference queries in a database for prediction of the runtime of a target query in the database based on similarity of the target query with the reference queries, the method comprising:

providing a number (n) of numerical values ($x_1, \ldots, x_n$) that represent the runtimes of the reference queries;

computing the optimal K-means clustering of the numerical values for a predetermined number (K) of clusters, wherein the computing includes iterating, a number of times corresponding to the predetermined number of clusters, a linear-time Row Minima Searching algorithm applied to a square matrix (H) of order equal to the number of numerical values; and clustering the reference queries according to the computed clustering of the numerical values, wherein the numerical values ($x_1, \ldots, x_n$) are sorted and indexed accordingly, and the iterating within the computing includes, at each respective iteration rank (k), and for each respective index (j) inferior to the number (n) of numerical values, the computation of the minimal total distortion ($TD_{min}(j,k)$) achievable for the subset of numerical values ($x_j$) indexed lower than the respective index (i<=j), with a number of clusters corresponding to the respective iteration rank (k), according to the linear-time Row Minima Searching algorithm applied to the square matrix (H), and wherein, at each respective iteration rank (k), and for each respective index (j) inferior to the number (n) of numerical values, for each row index (i) and each column index (j), the matrix entry (H(i,j)) corresponds to a sum of:

the minimal total distortion ($TD_{min}(i-1,k-1)$) computed at the previous iteration for the index (i−1) preceding the row index, and a distortion (disto(i,j)) of the contiguous subset ($x_i, \ldots, x_j$) of the numerical values between the row index and the column index.

8. The system of claim 7, wherein the memory further stores a database, the system being configured to execute the computer program on reference queries in the database and/or on a target query in the database.

* * * * *